Aug. 15, 1950  E. G. BOOTH  2,518,596
CARROT HARVESTER
Filed July 21, 1947  4 Sheets-Sheet 1

E. G. Booth
INVENTOR
BY C. A. Snowles.
ATTORNEYS.

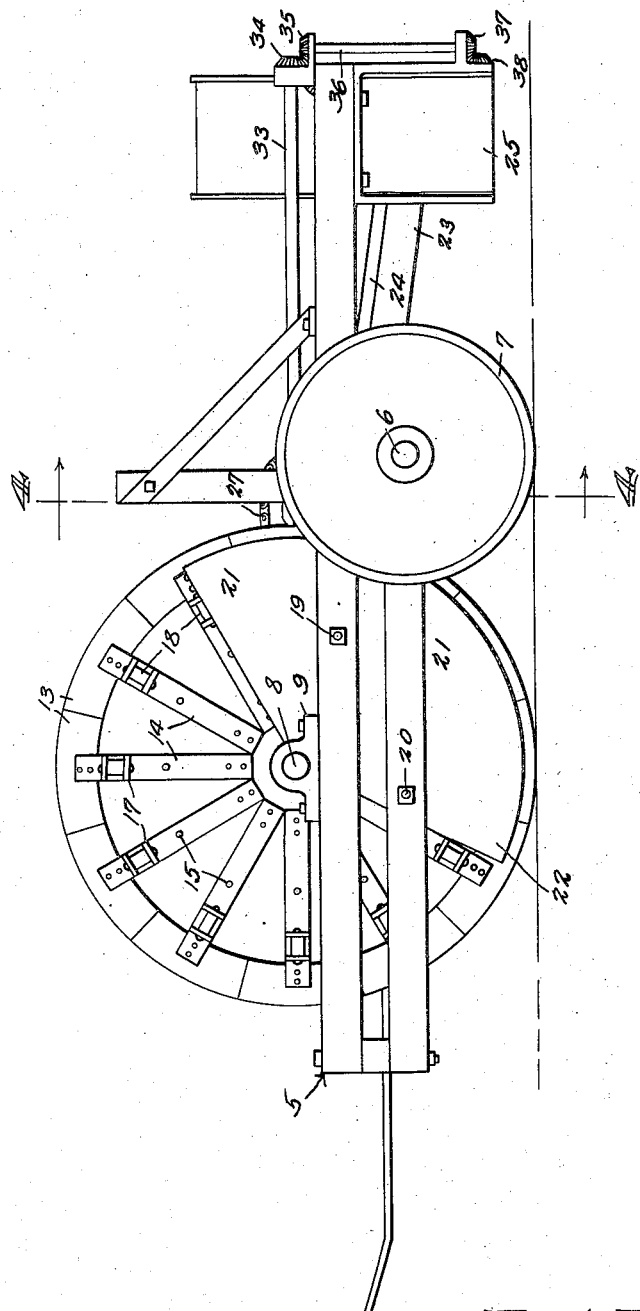

Aug. 15, 1950    E. G. BOOTH    2,518,596
CARROT HARVESTER
Filed July 21, 1947    4 Sheets-Sheet 3
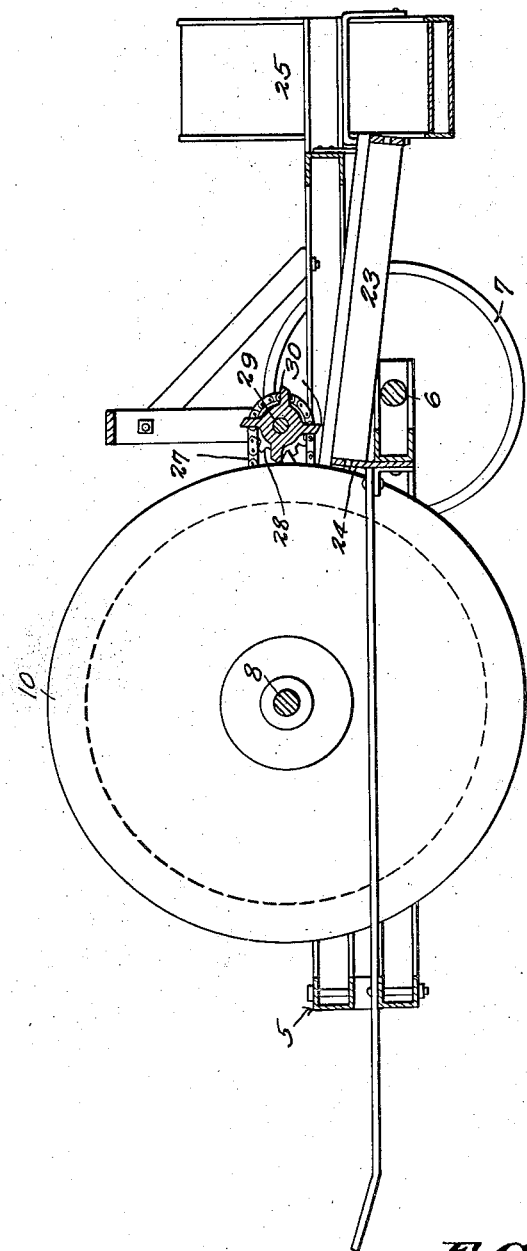
E.G.Booth
INVENTOR
BY C.A.Snow & Co.
ATTORNEYS.

Aug. 15, 1950  E. G. BOOTH  2,518,596
CARROT HARVESTER
Filed July 21, 1947  4 Sheets-Sheet 4
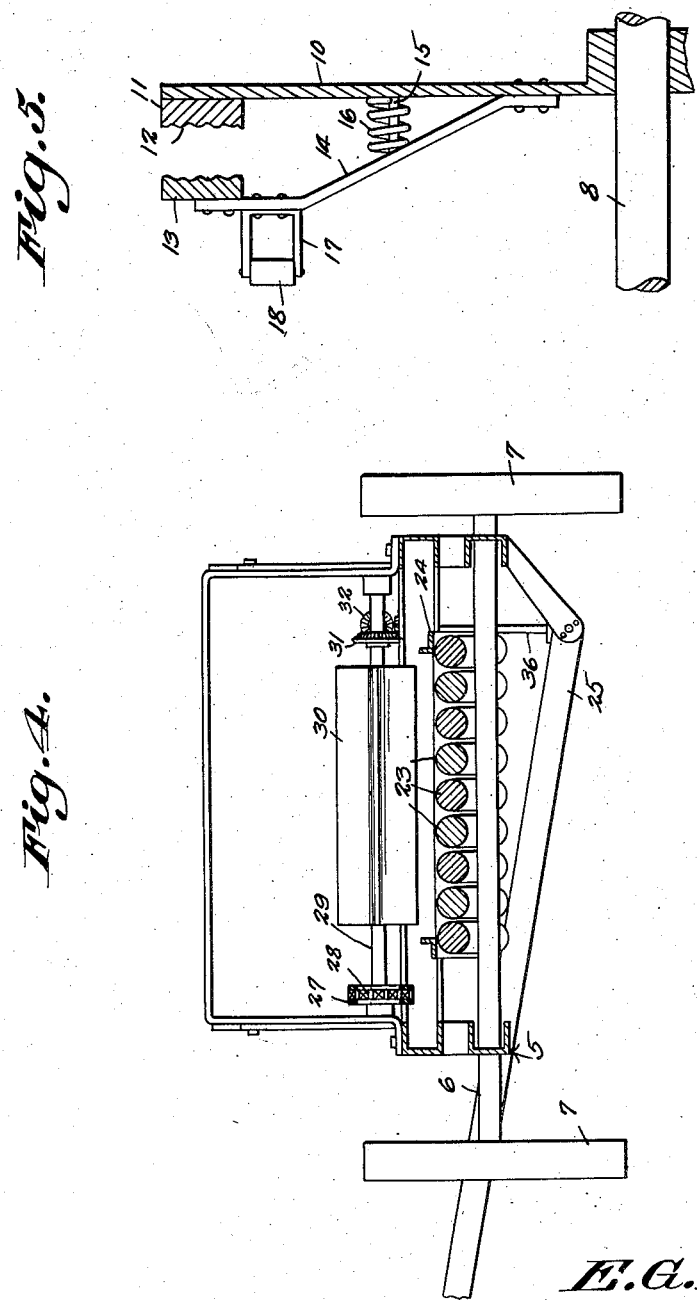
E. G. Booth
INVENTOR
BY C. A. Snow & Co.
ATTORNEYS.

Patented Aug. 15, 1950

2,518,596

UNITED STATES PATENT OFFICE 2,518,596

CARROT HARVESTER

Edwin G. Booth, Canandaigua, N. Y.

Application July 21, 1947, Serial No. 762,435

3 Claims. (Cl. 55—108)

This invention relates to agricultural machines, and more particularly to machines designed primarily for harvesting carrots or like vegetables having tops.

An important object of the invention is to provide a machine of this character which may be moved along rows of carrots, the machine having means for gripping the carrot tops, pulling the carrots from the soil, means being provided for delivering the carrots to an endless conveyor from where the carrots are delivered to a place of deposit, means being provided for cutting the tops from the carrots, on the passage of the carrots from the carrot-pulling means.

Still another object of the invention is to provide a harvester of this character which may be hitched to any suitable power device and pulled along a field, the supporting wheels of the device being so arranged that they will straddle the rows of carrots being harvested.

With the foregoing and other objects in view which will appear as the description proceeds, the invention consists of certain novel details of construction and combinations of parts, hereinafter more fully described and pointed out in the claims, it being understood that changes may be made in the construction and arrangement of parts without departing from the spirit of the invention as claimed.

Referring to the drawings

Figure 2 is a side elevational view thereof.

Figure 3 is a longitudinal sectional view through the machine taken on line 3—3 of Figure 1.

Figure 4 is a vertical sectional view taken on line 4—4 of Figure 2.

Figure 5 is a fragmental sectional view through one of the vegetable-pulling discs and illustrating a pivoted cooperating arm for gripping the tops of the carrots being harvested.

Figure 1:
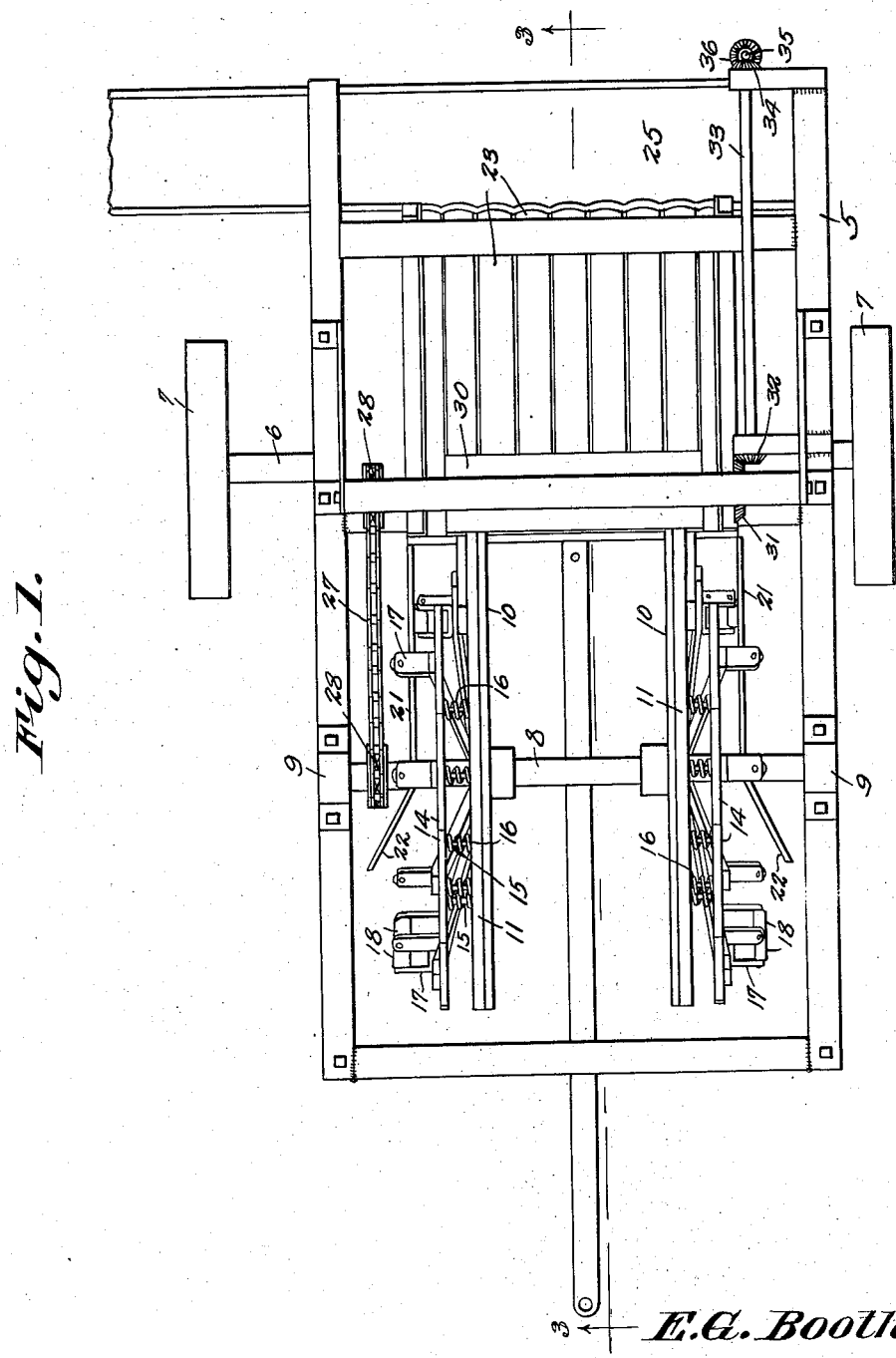
Figure 1 is a plan view of a carrot harvester, constructed in accordance with the invention.

Referring to the drawings in detail, the machine comprises a rectangular frame indicated generally by the reference character 5 to which the supporting axle 6 is connected, the axle 6 providing the mount for the wheels 7. The reference character 8 indicates a horizontal shaft that is mounted in bearings 9 secured to the frame, as clearly shown by Figure 1 of the drawings.

Secured to the shaft 8, are discs 10 that are of diameters to contact the ground surface, as the machine is being moved along a row, the discs being arranged in spaced parallel relation with each other to operate in vertical planes.

Secured to the outer surfaces of the discs adjacent to the outer edges thereof, are rings 11 that are formed with corrugated surfaces 12 that cooperate with the corrugated surfaces of the members 13 that are carried on the inner surfaces of the movable arms 14, near the ends thereof, in gripping the tops of the carrots being harvested.

These arms 14 may be hingedly connected to the discs 10, however in the present showing, the arms 14 are constructed of spring metal, so that they will move with respect to the discs. The reference character 15 indicates a pin carried by each of the arms 14, the pins moving through openings in the discs 10. Coiled springs 16 are mounted on the pins and disposed between the arms 14 and discs, normally urging the arms outwardly or away from the discs. Secured to each of the arms 14, is a yoke 17 in which the vertical rollers 18 are mounted.

Secured to the frame, as by means of the bolts 19 and 20 that extend inwardly from the side rails of the frame, are cam plates 21, which cam plates have their forward edges extended laterally providing cams 22 which lie in the paths of travel of the rollers 18. These cam plates are so arranged that when the rollers 18 move thereover, the arms 14 will be moved inwardly into cooperative relation with the rings 11 to grip the tops of carrots which extend above the rows of carrots. It will, of course, be understood that the operation is so timed that the arms will fall opposite to the carrots as the machine is moving along the rows. As the rollers 18 move past the upper ends of the cam plates 21, the coiled springs 16 will act to move the arms laterally to release the carrots at this point.

Mounted directly at the rear of the discs 10, are rollers 23 which operate in parallel spaced relation with respect to each other, the ends of the rollers being journaled in bearings formed in the end bars of the frame 24 which is normally inclined downwardly towards the rear of the machine to cause the carrots which are deposited thereon, to gravitate to the lower ends of the rollers, where they are deposited on the endless conveyor 25 operating transversely of the machine at the rear thereof, as clearly shown by Figure 1 of the drawings.

Secured to the shaft 8, is a sprocket 26 over which the chain 27 operates, the chain 27 operating over the sprocket 28 secured to one end of the shaft 29 that extends transversely of the frame directly at the front ends of the rollers 23, the shaft 29 providing a support for the rotary cutting blades 30 that operate in such proximity to the rollers, that the carrot tops will be cut from the carrots, as the tops are delivered onto the rollers.

On the shaft 29 is a pinion 31 that meshes with the pinion 32 secured on one end of the shaft 33, the shaft 33 having the pinion 34 that meshes with the pinion 35 secured on the shaft 36. At the lower end of the shaft 36 is a pinion 37 that meshes with the pinion 38 secured on one end of the shaft over which the lower end of the endless conveyor 25 operates. Thus, it will be seen that due to this construction, the endless conveyor, will operate to convey the carrots which have been topped, by the rotary cutting blades 30, to a place of deposit where they may be sacked or otherwise packed for shipment.

In operation, the machine is placed at one end of a field in such a way that the discs 10 thereof will fall directly over rows of carrots to be harvested. As the machine is moved along the row, the arms are moved inwardly into gripping relation with the discs, whereupon the tops of the carrots will be gripped and carried upwardly where they will be moved through the machine directly under the rotary cutter 30 where the tops will be removed and the carrots deposited on the rollers 23 to move longitudinally thereof onto the endless conveyor where they will be conveyed to a place for shipment.

In view of the foregoing detailed disclosure, it is believed that a further description as to the operation of the machine is unnecessary.

What is claimed is:

1. A carrot-harvesting machine comprising a wheel-supported frame, a pair of discs operating in parallel spaced relation with respect to each other, mounted on the frame, said discs contacting with the ground surface rotating the discs as the discs move over the ground surface, radiating arms mounted on the discs and cooperating with the discs in gripping tops of carrots, pulling the carrots from the ground as the discs rotate, inclined rollers onto which harvested carrots are deposited as the discs rotate, a rotary cutter mounted on the frame for cutting the tops from the carrots as the carrots move from the discs to said rollers, and an endless conveyor onto which carrots from the rollers are delivered for packing.

2. A carrot-harvesting machine comprising a wheel-supported frame, a pair of discs operating in vertical planes, mounted within the frame, arms pivotally mounted on the discs and cooperating with the discs in gripping carrot tops, means mounted on the frame and disposed in the path of travel of said arms for moving the arms into gripping relation with the discs, inclined rollers onto which the carrots are delivered, a rotary member operating adjacent to the rollers for cutting the tops from the carrots, and means disposed adjacent to the rotary cutting members for delivering the carrots to a place of deposit.

3. A carrot-harvesting machine, comprising a wheel-supported frame, a pair of discs operating in vertical planes mounted within the frame, said discs contacting with the ground surface over which the machine is moving, rotating the discs, gripping members on the arms gripping tops of carrots over which the machine is moving, removing the carrots from the ground surface, a plurality of rollers mounted on the frame and onto which carrots are deposited, a rotary cutting member operating on the frame engaging the carrot tops cutting the carrot tops from the carrots, and means for delivering the carrots to a place of deposit.

EDWIN G. BOOTH.

REFERENCES CITED

The following references are of record in the file of this patent:

UNITED STATES PATENTS

| Number | Name | Date |
|---|---|---|
| 1,166,762 | Holub | Jan. 4, 1916 |
| 1,333,324 | McDowell | Mar. 9, 1920 |
| 2,358,872 | Morris | Sept. 26, 1944 |

FOREIGN PATENTS

| Number | Country | Date |
|---|---|---|
| 69,352 | Sweden | May 1, 1930 |